Aug. 25, 1964

W. GIGER, JR 3,146,379

CIRCUIT BREAKER PANELBOARD WITH DISCRIMINATING MEANS

Filed Aug. 5, 1959

INVENTOR.
WALTER GIGER, JR.
BY Robert T. Casey
ATTORNEY

United States Patent Office 3,146,379
Patented Aug. 25, 1964

3,146,379
CIRCUIT BREAKER PANELBOARD WITH
DISCRIMINATING MEANS
Walter Giger, Jr., East Hartford, Conn., assignor to
General Electric Company, a corporation of New York
Filed Aug. 5, 1959, Ser. No. 831,803
5 Claims. (Cl. 317—119)

My invention relates to circuit breaker panelboards and load centers and especially to such panelboards and load centers including circuit breakers which have at least one terminal connected by a plug-in type electrical connection.

Circuit breakers used in such panelboards and load centers are made in various ampere ratings, such as 15, 20, 30, and 50 amperes, the selection of a breaker of given rating being dictated by the requirements of the circuit which it is intended to protect. It is therefore desirable that such panelboards and load centers include some means to prevent or discourage the indiscriminate interchanging of circuit breakers, so that a circuit breaker of given ampere rating will not be mounted at a location where a circuit breaker of lower ampere rating should be mounted. The importance of this protection has been recognized especially in connection with plug-in type circuit breakers by safety code and inspection requirements requiring such protective means.

Prior art systems for protecting against the indiscriminate interchanging of circuit breakers have suffered from several disadvantages. Some of such systems have required too substantial and extensive revision of existing circuit breaker panelboards and load centers. Other systems have been limited to discriminating between only two types of circuit breakers whereas the ability to discriminate between at least three types is desirable. Still other systems have been too complicated in operation for the convenient use thereof by those installing or replacing such breakers.

Accordingly, it is a general object of the invention to provide an electric circuit breaker panelboard including circuit breakers and circuit breaker mounting means whereby a circuit breaker of given ampere rating cannot be mounted and energized at a predetermined location where a circuit breaker of lower ampere rating is desired.

Another object of the invention is to provide an electric circuit breaker panelboard including a mounting base which is initially adapted to receive circuit breakers of varying ampere rating without modification, and means for readily modifying said mounting base so that predetermined circuit breaker mounting locations shall, after such modification, be incapable of receiving circuit breakers of predetermined selected ampere rating.

In accordance with my invention in one form, a circuit breaker panelboard is provided including a mounting base having at least one generally hook-shaped circuit breaker retaining lug or hook and an electrical contact spaced apart from said lug, and a circuit breaker having a shelf-like portion of its casing adapted to be received under said mounting lug and having a plug-in type electrical contact spaced away from said first portion, whereby said circuit breaker is adapted to be mounted in said panelboard by inserting said shelf portion of said casing under the said retaining hook and pivoting the circuit breaker about this point into plugged-in engagement with the electrical contact. The invention further includes in combination with the panelboard just described, blocking means adapted to be received under the retaining hooks to prevent the insertion at such location of all but certain predetermined circuit breakers.

The term "circuit breaker" as used herein refers to any device capable of making and/or breaking an electric circuit, including those operable manually or otherwise, including fusible means.

The invention will be clearly understood from the following detailed description, taken in connection with the accompanying drawing, and its scope will be pointed out in the appended claims.

FIGURE 1 is a perspective view of a circuit breaker panelboard assembly, one circuit breaker being shown in place;

FIGURE 2 is a sectional view taken on the line 2—2 of FIGURE 1;

FIGURE 3 is a view in perspective of a series of discriminating elements, with a portion of a circuit breaker casing also shown adjacent one of the discriminating elements;

FIGURE 4 is an elevational view of portions of the casings of a series of circuit breakers for use with the elements of FIGURE 3;

FIGURE 5 is a view in perspective of a second series of discriminating elements;

FIGURE 6 is a view similar to FIGURE 4, of a series of circuit breakers for use with the elements of FIGURE 5.

In the drawings, the invention is shown as incorporated in an electric circuit breaker panelboard including a mounting base assembly 10, adapted to receive a plurality of electric circuit breakers 12, only one shown. The mounting base assembly includes a generally channel-shaped supporting pan 13 having outwardly directed integral flange portions 14 for supporting circuit breakers in a manner to be described. The flange portions 14 are provided with integral upwardly directed retaining hooks or lugs 15 for engaging and retaining the circuit breaker in a manner to be described. Each of the hooks 15 includes a first portion 15A which extends vertically or perpendicular to the plane of the supporting flange portion 14, and a second portion 15B which extends parallel to the plane of the supporting flange portion 14.

An insulating supporting block 16 is mounted in the generally central portion of the supporting pan 13 and is retained thereon by suitable means such as by having a lug portion 17 retained under a retaining hook 18 and having a locking tab 19 bent upwardly from the back wall of the pan 13 to retain the lug 17 under the hook 18. The insulating block 16 has mounted on its upper surface a generally U-shaped bus bar conductor 20 having two upwardly extending blade portions 21 and 22 and a centrally mounted connector 22A. The bus bar 20 and the connector 22A are retained on the insulator 16 by suitable means, such as by a bolt, not shown, extending upwardly through a suitable aperture, not shown, in the block 16 and into threaded engagement with the bottom wall of the connector 22A. Additional contact blades 23, only one shown, are also supported on the insulating block 16. It will be appreciated that the number and location and arrangement of bus bar conductors such as 20 and contact blades such as 21, 22, 23, may be greatly varied to suit the needs of particular circuits and application without affecting the applicability of the subject invention.

A pair of blocking strips 24 are mounted on the underside of the flanges 14 by suitable means, such as by welding, in order to fill in the openings left by striking out the retaining lugs 15, for a purpose to be described.

The circuit breaker 12 includes a generally rectangular insulating casing having an operating mechanism, not shown, contained therein, and adapted to be operated by a manually engageable handle member 26, the circuit breaker casing 25 has a slot opening adjacent one corner thereof by which the circuit breaker is adapted to fit over a portion of the contact blade 21 to permit plug-in type electrical connection between the contact blade 21 and contact jaws 27 contained within the circuit breaker casing. The circuit breaker casing has, at the end opposite the plug-in contact end, a recess extending inwardly adjacent the bottom wall, forming a shelf or lug portion 28 which is adapted to be received under one of the retaining hooks 15. The circuit breaker panelboard construction as thus far described is conventional and as shown, for example, in Patent No. 2,738,446, issued March 13, 1956, to W. J. Fleming and assigned to the same assignee as the present invention, with the exception of the strips 24 added to the underside of the flanges 14.

For the purpose of providing discrimination between circuit breakers having the same casing dimensions but having different ampere ratings, I provide discriminating means to be described.

In accordance with the present invention, a plurality of circuit breakers 12 are provided, each having a recess 28 in the enclosing casing at one end thereof and a line socket contact 27 at the other end thereof whereby any of such circuit breakers may be mounted on a panel base 10 of conventional construction, with the hook portion 15 of the flanges 14 being received in the recess 28, the breaker being rotated about its engagement with the hook 15 and into plugged-in engagement with one of the contact blades 21, 22, 23. In accordance with the present invention, however, the circuit breakers 12 and the panel base 10 are each provided with discriminating means whereby circuit breakers of only certain predetermined ratings or capacities may be mounted at certain preselected mounting positions on the panel base 10.

For this purpose, the casings of the circuit breakers are selectively provided with predetermined modifications, and a series of blocking or discriminating elements are provided for use therewith. Accordingly, in the form of the invention shown in FIGURES 3 and 4, a series of discriminating elements 30, 31 and 32 are provided. The discriminating elements 30 each include a base portion 33 of resilient material such, for example, as spring steel. The base 33 is provided with a slight bend along the center thereof so that it normally assumes a slight V-shaped condition, as shown in FIGURE 3. The discriminating element 30 further includes an upstanding vertical portion 34 comprising a return-bent strip of rigid material such as spring steel, having outwardly bent bottom flanges 35 attached to the base portion 33 by suitable means such as by welding. Each discriminating element is adapted to be received and locked in place under the horizontally extending portion 15B of one of the hooks 15 as shown in FIGURES 1 and 2, by having the base portion 33 received in the aperture 15' in the flanges 14, the apertures 15' being closed for this purpose by strips 24 attached to the flanges 14 by suitable means. For the purpose of securely retaining the locking element 30 in position, the height of the vertical portion 34 is preferably made such that it is necessary to slightly flatten the base portion 33 in order to insert the discriminating element 30 under the hook 15. The resilience of the base portion 33 therefore locks the element 30 securely in position under the hook portion 15 in compression between the horizontal portion 15B of the hook member 15 and the retaining plate 24 attached to the bottom of a flange 14. The upstanding vertical portion 34 of the discriminating element 30 is positioned generally centrally of the base 33. The discriminating element 31 is provided with a single upstanding vertical portion 36 which is offset to one side of the central portion of the base 33. The discriminating element 32 is provided with a pair of spaced apart vertical portions 37 each positioned at one side of the center line of the base 33. The discriminating elements 31 and 32 are otherwise similar in construction to the element 30 and are adapted to be retained under the hooks 15 in a manner similar to that described in connection with the element 30.

For the purpose of cooperating with the discriminating elements 30, 31, 32, a series of circuit breakers are provided as described above, each having identically dimensioned enclosing casings except for modifications to be described. Each of the enclosing casings 12 of the circuit breakers 12A, 12B, 12C, and 12D, include a recess at one end of the circuit breaker casing, the recess 28 being closed at one side by a projecting shelf 38 which is adapted to be received under one of the hooks 15. The circuit breakers 12A have the shelf portion 38 unmodified. The circuit breakers 12B have the shelf portion 38 provided with a centrally located slot 39. The circuit breakers 12C have the shelf portion 38 provided with a slot 40 positioned at one side of the central portion of the circuit breaker casing. The circuit breakers 12D have the shelf portion 38 provided with a pair of spaced apart slots 41 each positioned at one side of the central line of the circuit breaker casing. In accordance with this form of the invention, the circuit breakers 12A are of relatively high capacity such as 50 amperes; the circuit breakers 12B are of relatively lower capacity such as 30 amperes; the circuit breakers 12C are of lower ampere capacity such as 20 amperes; and the circuit breakers 12D are of still lower ampere capacity such as 15 amperes.

With this arrangement, it will be apparent that at circuit breaker mounting positions where no discriminating or blocking element has been inserted under the hook 15, any of the circuit breakers of FIGURE 4, 12A–12D, may be mounted at such position.

At a circuit breaker mounting position where a discriminating element 30 has been mounted under the hook 15, such as shown on the left-hand side of the panel assembly of FIGURE 1, it will be apparent that only circuit breakers such as 12B having a slot centrally positioned in the shelf portion 38 thereof, may be mounted at such location, and that it is not possible to mount a higher-rated breaker such as 12A at such location.

It will be further be observed that at circuit breaker mounting positions where a discriminating element 31 has been inserted under the hook 15, only circuit breakers such as 12C and 12D having a slot in the left-hand side portion of the shelf 38 may be mounted at such location, while higher-rated breakers such as 12A and 12B, may not be mounted at such position.

It will further be observed that at circuit breaker mounting positions where a discriminating element 32 has been inserted under the hook 15, only circuit breakers such as 12D having a pair of slots on opposite sides of the central line of the circuit breaker casing may be mounted at such locations, and the higher-rated breakers 12A, 12B, 12C, may not be mounted at such location.

In the form of the invention shown in FIGURES 5 and 6, a series of discriminating elements 42, 43, 44 are provided, for use with a series of circuit breakers having casings 12A, 12E, 12F, and 12G. In this form, the discriminating element 42 has a single upstanding portion positioned at one side of its center line, the element 43 has two upstanding portions, one being on the center line of the base and the other being at one side of the center line, while the third element 44 has three upstanding portions including one on the center line of the base and one at each side thereof. The casings 12E, 12F, and 12G have slots 45, 46, 47, corresponding in number and position to the upstanding portions of the elements 42, 43, and 44, respectively. In this form of the invention, a circuit breaker of given ampere rating may be replaced by a circuit breaker of the same or *lower* ampere rating, but not by a circuit breaker of *higher* rating.

It will be observed that two types of discrimination or selectivity are provided by the arrangements disclosed. These types of selectivity may be referred to as (1) "completely exclusive" and (2) "class exclusive" types.

The term "completely exclusive" is used to refer to a construction whereby circuit breakers of only a single predetermined type may be mounted at the particular mounting location in question. Thus in the form of the invention shown in FIGURES 3 and 4, the arrangement involving the discriminating element 30 and the circuit breaker 12B may be termed a *completely exclusive* discrimination arrangement, since when a discriminating element 30 is mounted under one of the hooks 15, only circuit breakers 12B may be mounted at this location, and none of the other breakers 12A, 12C, or 12D, shown may be mounted at such location. The second type of "class exclusive" discrimination is illustrated by the form of the invention shown in FIGURES 5 and 6, in which the use of any one of the discriminating elements 42, 43, 44, has the effect of excluding use at that location, of any circuit breaker of higher rating but permits the use of a circuit breaker of equal or lower rating.

In general, it is desirable to prevent the removal of a circuit breaker of a given rating in a circuit breaker panel assembly which has been installed, and replacing it by a circuit breaker having a higher rating. This, of course, is because the circuit breaker of higher rating will not afford adequate protection to the wiring of the circuit which is connected at that point. On the other hand, there is ordinarily no harm in removing a circuit breaker of a given rating and replacing it by a circuit breaker of a lower ampere rating, since the lower ampere rated circuit breaker will operate to remove power from the circuit long before any dangerous overload condition can occur. At the same time, it is sometimes useful to have some means for indicating that a circuit breaker of too low an ampere rating should not be mounted at a particular location, since "nuisance tripping" may occur in such cases.

It will be obvious that a great many variations may readily be made of the systems disclosed herein without departing from the general plan of the invention. It will also be apparent that the invention may be used with electric control devices other than circuit breakers, including for example, fuses, and especially fuses mounted in a separate insulating casing.

The method of assembling the discriminating elements 30, 31 and 32 under the hooks 15 is such that it may not be easily defeated even by use of an ordinary type of tool such as a screwdriver, since no edge portions of the base 33 or the flanges 35 are exposed above the general level of the top surface of the flanges 14, and it is not possible to remove the blocking elements by force exerted on the vertically extending portions.

While I have disclosed only certain embodiments of the invention, it will be readily appreciated that many modifications thereof may be made. I therefore intend, by the appended claims, to cover all such modifications as fall within the true spirit and scope of the invention.

What I claim as new and desire to secure by Letters Patent of the United States is:

1. An electric circuit control device panelboard comprising:
    (a) a support having a generally planar supporting portion, said supporting portion having a plurality of circuit control device mounting positions,
    (b) at least one retaining hook at each of said mounting positions, each of the retaining hooks including a first portion extending substantially perpendicular to the plane of said supporting portion and a second portion extending substantially parallel to said plane of said supporting portion,
    (c) discriminating means including at least two blocking portions, each of said blocking portions being under one of said retaining hooks,
    (d) each of said blocking portions extending substantially perpendicular to the plane of said supporting portion and projecting toward the second portion of the corresponding retaining hook to block the opening thereof, the positions of the blocking portions differing with respect to their corresponding retaining hooks,
    (e) at least two electric control devices each including an insulating casing having a shelf portion receivable under the second portion of said retaining hooks,
    (f) each of said control devices having its shelf portion provided with a clearance recess corresponding to the position of the blocking portion in a different one of said retaining hooks.

2. An electric control device panelboard comprising:
    (a) a support having a generally planar supporting portion,
    (b) an aperture in said supporting portion,
    (c) a retaining hook carried by said supporting portion and including a first portion extending substantially perpendicular to the plane of said supporting portion and a second portion extending substantially parallel to the said plane of said supporting portion, said horizontally extending portion of said retaining hook extending over said aperture,
    (d) means closing said aperture at the under surface of said surface portion,
    (e) an electric control device comprising an insulating casing including a shelf portion receivable under said retaining hook,
    (f) a blocking portion under said retaining hook supported on said means closing said aperture,
    (g) said blocking portion extending substantially perpendicular to the plane of said generally planar supporting portion and projecting toward the second portion of said retaining hook to block the opening thereof,
    (h) said control device shelf portion having a slot cut therein at a position corresponding to the position of said blocking portion.

3. An electric circuit control device panelboard comprising:
    (a) a support having a generally planar supporting portion, said supporting portion having a plurality of circuit control device mounting positions,
    (b) at least one retaining hook at each of said mounting positions, each of said retaining hooks including a first portion extending substantially perpendicular to the plane of said supporting portion and a second portion extending substantially parallel to said plane of said supporting portion,
    (c) a series of discriminating elements, each mounted under one of said retaining hooks respectively,
    (d) each of said discriminating elements including a generally horizontal base portion and a generally perpendicular blocking portion, said discriminating elements differing from each other with respect to the position of said blocking portion with relation to said base portion,
    (e) a series of electric control devices each including an insulating casing having a shelf portion receivable under said horizontally extending portion of said retaining hooks,
    (f) each of said control devices having its said shelf portion provided with a clearance recess corresponding to the position of the blocking portion of a different one of said discriminating elements.

4. An electric control device panelboard comprising:
    (a) a support having a generally planar supporting portion,
    (b) an aperture in said supporting portion,
    (c) a retaining hook carried by said supporting portion and including a first portion extending substantially perpendicular to the plane of said supporting portion and a second portion extending substantially parallel to the said plane of said supporting portion, said horizontally extending portion of said retaining hook extending over said aperture,
    (d) means closing said aperture at the under surface of said surface portion,
    (e) an electric control device comprising an insulating casing including a shelf portion receivable under said retaining hook, (f) a generally inverted T-shaped discriminating element having the head portion of said T receivable in said aperture and the stem portion of said T extending into engagement with said horizontally extending portion of said retaining hook, and (g) said control device shelf portion having a slot cut therein at a position corresponding to the position of said stem of said T.

5. An electric control device panelboard comprising:

(a) a support having a generally planar supporting portion, (b) an aperture in said supporting portion, (c) a retaining hook carried by said supporting portion and including a first portion extending substantially perpendicular to the plane of said supporting portions and a second portion extending substantially parallel to the said plane of said supporting portion, said horizontally extending portion of said retaining hook extending over said aperture, (d) means closing said aperture at the under surface of said surface portion, (e) an electric control device comprising an insulating casing including a shelf portion receivable under said retaining hook, (f) a blocking portion under said retaining hook supported on said means closing said aperture, (g) said blocking portion extending substantially perpendicular to the plane of said generally planar supporting portion and projecting toward the second portion of said retaining hook to block the opening thereof, (h) said control device shelf portion provided with a clearance recess therein at a position corresponding to the position of said blocking portion.

References Cited in the file of this patent

UNITED STATES PATENTS

| | | |
|---|---|---|
| 1,405,254 | Baker | Jan. 31, 1922 |
| 2,883,587 | Dorfman | Apr. 21, 1959 |
| 2,910,629 | Casey | Oct. 27, 1959 |
| 2,910,630 | Hammerly | Oct. 27, 1959 |
| 2,916,675 | Middendorf | Dec. 8, 1959 |
| 2,921,240 | Cole | Jan. 12, 1960 |
| 2,928,998 | Brumfield | Mar. 15, 1960 |

FOREIGN PATENTS

| | | |
|---|---|---|
| 621,316 | Great Britain | Apr. 7, 1949 |